United States Patent [19]
Fletcher et al.
[11] 3,777,272
[45] Dec. 4, 1973

[54] DIGITAL SECOND-ORDER PHASE-LOCKED LOOP

[76] Inventors: James C. Fletcher, Administrator of the National Aeronautics and Space Administration with respect to an invention of; Jack K. Holes, 9412 Cattaraugus, Los Angeles; Christopher Carl, 420 S. Madison, Apt. 209, Pasadena; Carl R. Tegnelia, 1800 State St., South Pasadena, all of Calif.

[22] Filed: Sept. 18, 1972

[21] Appl. No.: 290,030

[52] U.S. Cl. .................... 329/104, 178/88, 325/320, 329/122, 329/126

[51] Int. Cl. .......................... H03k 9/00, H03d 3/24

[58] Field of Search ...................... 329/50, 104, 122, 329/126; 328/118; 325/320; 178/66, 88

[56] References Cited

UNITED STATES PATENTS

| | | | |
|---|---|---|---|
| 3,222,454 | 12/1965 | Losee | 325/320 X |
| 3,514,702 | 5/1970 | Nahay et al. | 325/320 |
| 3,525,945 | 8/1970 | Puente | 320/320 X |
| 3,594,651 | 7/1971 | Wolejsza | 329/122 X |
| 3,636,454 | 1/1972 | Pasternack | 329/104 X |

*Primary Examiner*—Alfred L. Brody
*Attorney*—Monte F. Mott et al.

[57] ABSTRACT

A digital second-order phase-locked loop is disclosed in which a counter driven by a stable clock pulse source is used to generate a reference waveform of the same frequency as an incoming waveform, and to sample the incoming waveform at zero-crossover points of the reference waveform. The samples are converted to digital form and accumulated over M cycles, reversing the sign of every second sample. After every M cycles, the accumulated value of samples is hard limited to a value SGN $=\pm 1$ and multiplied by a value $\Delta_1$ equal to a number $n_1$ of fractions of a cycle. The SGN values are accumulated to form a value $\Sigma$ which is multiplied by a value $\Delta_2$ equal to a number $n_2$ of fractions of a cycle, where $n_1$ is greater than $n_2$. The product $\Delta_2 \Sigma$ 4 is added to the product $\Delta_1$ SGN at the end of every M cycles to form an error signal in digital form. That error signal is used to advance or retard the counter according to the sign of the sum by an amount equal to the sum $\Delta_r$ SGN$+\Delta_2 \Sigma$, this continually synchronizing the output waveform of the counter with the incoming waveform.

10 Claims, 3 Drawing Figures

DIGITAL SECOND-ORDER PHASE-LOCKED LOOP

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to a digital second-order phase-locked loop.

In the design of a phase-locked loop for spacecraft applications, the prime requirements are simplicity and reliability. Digital circuits offer superior long term reliability compared with analog circuits. Consequently, the implementation of a digital phase-locked loop would offer advantages. A simple implementation may be achieved by making discrete corrections of a fixed size to a locally generated signal according to the sign of any phase error periodically detected between the incoming signal and the locally generated signal.

It has been determined recently that the relative Doppler shift of a subcarrier, previously assumed to be $1 \times 10^{-5}$ is, in fact, $1 \times 10^{-4}$. Because of this greater Doppler shift, greater by an order of magnitude, such a simple implementation would not be adequate because it provides only a first-order digital phase-locked loop. The reason for this is that the Doppler shift of the subcarrier induces a static phase error in the receiver timing that increases with increasing Doppler. A second-order digital phase-locked loop would have no static phase error in the presence of a Doppler shift. Consequently, it would be desirable to have a digital second-order phase-locked loop which would not add significantly to the complexity of a digital first-order phase-locked loop.

SUMMARY OF THE INVENTION

In a digital phase-locked loop, a counter driven by a stable clock is employed to generate a reference waveform of the same frequency as an incoming waveform to be tracked. The counter output is used to sample the incoming waveform at each zero-crossover of the reference waveform. The samples are converted to digital form and accumulated over M cycles, reversing the sign of every other sample. The accumulated value of samples is hard limited to a value SGN equal to $\pm 1$ every M cycles of the reference waveform. Each value SGN is continually accumulated to form a value $\Sigma$ in digital form. Once every M cycles of the reference waveform, the current value SGN is multiplied by a value $\Delta_1$ equal to a number $n_1$ of fractions of the reference waveform cycle to form the product $\Delta_1$ SGN in digital form, and the current value $\Sigma$ is multiplied by a value $\Delta_2$ equal to a number $n_2$ of fractions of a cycle where $n_1$ is greater than $n_2$, and the fractions are of equal magnitude for both multipliers. Each product $\Delta_2$ in digital form is added to the product $\Delta_1$ SGN produced at the same time to form an error signal $\Delta_1$ SGN $+ \Delta_2 \Sigma$ at the end of every M cycles. That error signal is used during the next cycle of the reference waveform, i.e., during the first of the next M cycles, to advance or retard the counter according to the sign of the sum by a number of fractions of the reference waveform equal to the absolute value of the error signal.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
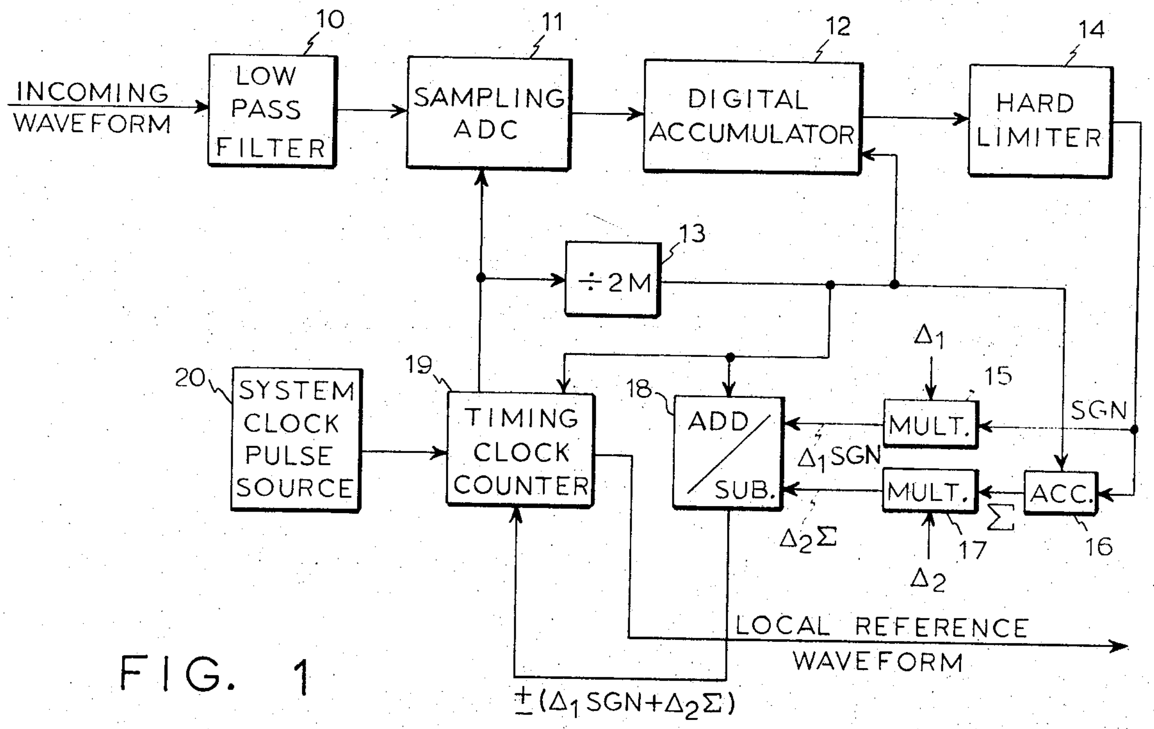
FIG. 1 illustrates in a block diagram the concept of an all digital second-order phase-locked loop in accordance with the present invention.

The concept of the present invention will first be described with reference to a block diagram shown in FIG. 1. For simplicity, it is assumed that the incoming waveform is a simple square wave, plus noise, although it should be understood that the phase-locked loop is suitable for sine waves and other cyclic waveforms. A low pass filter 10 removes out-of-band noise prior to sampling the incoming waveform in a sampling analog-to-digital converter 11, and also removes high-frequency signal components which comprise the transition of the square wave between positive and negative levels with respect to an intermediate reference level. It is possible to determine the best filter bandwidth for tracking, but generally other considerations of higher priority, such as data demodulation, will dictate the bandwidth of the filter. In practice, the filter is chosen to be a six pole Bessel filter with a cut-off frequency equal to 6.3 times the fundamental component of the signal carrier. The input level to the ADC is set such that, at the design threshold signal-to-noise ratio, limiting occurs on the $3\sigma$ noise peaks, i.e., set equal to the rms signal value plus three times the rms value of the noise.

Figure 2:
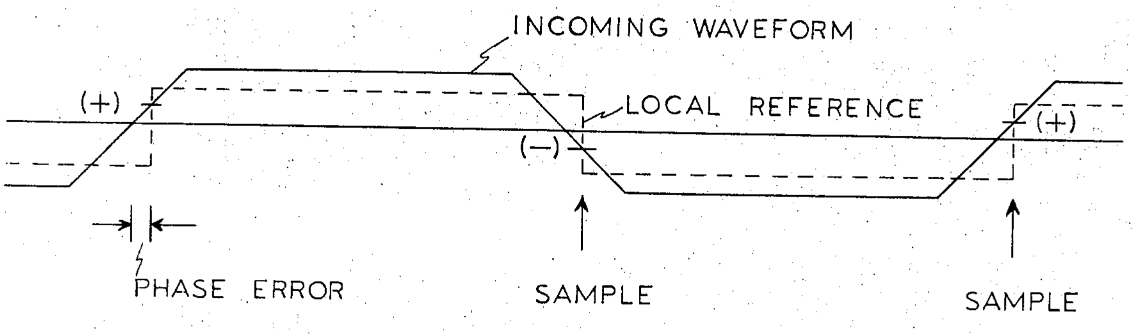
FIG. 2 illustrates in a waveform diagram the manner in which samples are taken of an incoming waveform by the system of FIG. 1 at transition (zero-crossover points) of a local reference waveform.

Tracking the incoming waveform is accomplished by sampling at the estimated zero-crossover points as shown in FIG. 2. These samples are accumulated in a digital accumulator 12 for one data bit period of M incoming (subcarrier) waveform cycles. If the first sample of one cycle of the waveform is positive, the next sample will be negative. Consequently, to accumulate the samples and obtain a value proportional to the error between the phase of the incoming waveform and the reference, the sign of the second sample of each incoming waveform cycle is reversed. In other words, alternate samples must be added and subtracted to allow for the positive-going and negative-going zero-crossovers of the incoming waveform. In addition, if bit sync and data modulation are present, the modulation must be accounted for in this accumulation in a manner to be described more fully hereinafter. Otherwise, the algebraic sign of the addition is controlled by the output of the counter 19 which is used as the local subcarrier reference in the communication system of which the phase-locked loop is a part. If this accumulation is properly done, a correct value of the incoming waveform phase error is produced.

In general, the selected samples may be summed over many cycles of the input waveform before any correction is made in the timing of the selected samples in order to improve signal-to-noise ratio. The number of cycles largely determines the bandwidth of the loop. For convenience, the number of cycles is selected to be M, which is the number of incoming waveform cycles per data bit. Therefore, 2M samples are accumulated for each correction of the phase error.

At the end of the M cycles, determined by a counter 13 which divides the number of samples taken by 2M, the sum of 2M samples is hard limited or quantized by a circuit The to determine only the polarity of the phase error. the circuit 14 thus quantizes the sum of the 2M samples to a value SGN $= \pm 1$, depending on the sign of the accumulated phase error. This can be easily implemented by a circuit which looks at only the sign of the accumulated phase error after every 2M samples.

The output SGN of the hard quantizing circuit 14 is multiplied by a fixed value $\Delta_1$ to obtain a partial first-order error signal. That multiplication is indicated by a functional block 15, but in practice the multiplication is carried out by simply adding or subtracting the value of the multiplier to the product $\Delta_2$ $\Sigma$ sine SGN$=\pm 1$, as will be better understood from the following descriptions. In addition, the output SGN of the circuit 14 is accumulated and multiplied by a fixed value $\Delta_2$. The accumulation is carried out by a functional block 16 and the multiplication by the value $\Delta_2$ is carried out by a functional block 17. In practice, the value $\Delta_2$ is set equal to 1 so that the multiplier 17 can be omitted, but, as will be described more fully hereinafter, the function of the multiplier 17 could be carried out by "scaling" the output of the accumulator 16 to the adder/subtracter 18. This second product is added to the first product in an adder/subtracter 18 to provide a second-order error signal. It is here at the digital inputs to the digital adder that multiplication by $\Delta_1$ can take place by the expedient of scaling since $\Delta_1$ is a fixed value.

The second-order error signal thus produced is applied to a timing clock counter 19 to advance or retard the count of clock pulses from a source 20 according to the sign of the second-order error signal. The amount by which the counter is advanced, or retarded, depends upon the magnitude of the second-order error signal. This correction of the phase of the counter 19 occurs during the next reference waveform cycle after 2M samples have been accumulated, hard limited and multiplied by $\Delta_1$.

Because the values $\Delta_1$ and $\Delta_2$ are fixed, and because the phase-locked loop examines only the polarity of phase error through the hard limiter 14, the resulting phase-locked loop has the advantage of being insensitive to input gain. As will be explained more fully hereinafter, all loop performance parameters, such as bandwidth and damping ratio, are strictly functions of $\Delta_1$, $\Delta_2$, M and the signal-to-noise ratio of the input signal. This remains true as long as the signal plus noise level is reasonably well scaled to the maximum input level that the sampler can accommodate in its analog-to-digital converting function. At any input gain level, the second-order phase-locked loop will function, although in extreme cases, some loss in the signal-to-noise ratio of the loop will result because of the upper and lower limits to the analog-to-digital converting function of the sampler 11. With a 4-bit analog-to-digital conversion at nominal gain level of the input waveform, the increase in noise variance in the phase-locked loop due to this high and low limit of the sampler 11 is less than 0.1 db.

From the foregoing, it is evident that implementation of this digital second-order phase-locked loop is not complex. The only major components required, besides the sampling analog-to-digital converter (ADC), are two digital accumulators and an adder/subtracter as will be described more fully with reference to FIG. 3. The ADC has a resolution of four binary bits and thus quantizes each of the samples into sixteen levels 0000 through 0111 for positive samples and 1111 through 1000 for negative samples in the 2'*s* complement form.

Figure 3:
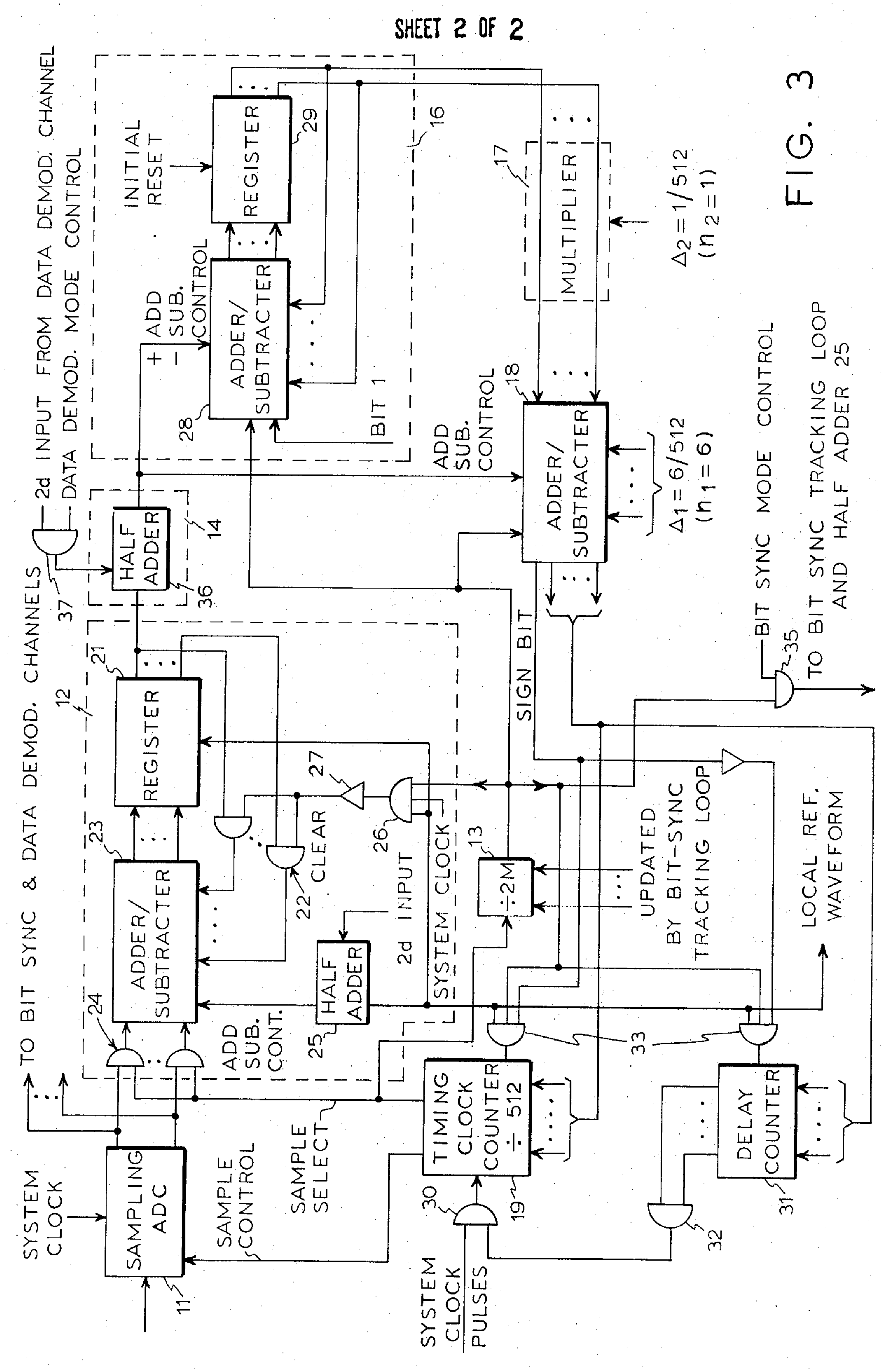
FIG. 3 illustrates a preferred embodiment of the invention.

In the exemplary embodiment shown in FIG. 3, the accumulator 12 is comprised of a parallel register 21 which recirculates through a bank of gates 22 to a parallel adder/subtracter 23. In that manner the digital output of the sampling analog-to-digital converter is accumulated every predetermined number of clock pulses. Each conversion takes place in ⅛ of a sample period in response to system clock pulses.

Due to the action of the input lowpass filter, little change in input voltage can occur during this conversion period. Consequently, a sample-and-hold circuit is not necessary; conversion may be accomplished by operating on the filter output directly using a successive-approximation algorithm to complete conversion in four system clock periods. Each sample converted is retained in digital form until the next sample period, and then cleared by the next sample-control pulse derived from the timing clock counter 19. This sample control pulse is selected to occur every 32 system clock pulses by the five least significant stages which gate the next system clock pulse every time all are true. The system clock frequency is selected to be 512 times the frequency of the input waveform. Consequently, 16 samples are taken every cycle of the incoming waveform, but only every eighth one is selected by a sample select pulse via a bank of gates 24. This sample-select pulse is produced by gating the next system clock pulse every time the three least significant stages are true. All sixteen samples are transmitted to bit sync and data demodulation channels.

To alternately control the function of the adder/subtracter to first add and then subtract the second sample of each cycle of the input waveform, the square wave output of the counter 19 controls the adder/subtracter via a half-adder 25. The second input to the half-adder is a local bit sync reference signal via a mode control gate 35 during the bit-sync mode of operation for the system in which this carrier tracking loop is used. When the half-adder output is high, the adder/subtracter adds and when its output is low, the adder/subtracter subtracts the output of the analog-to-digital converter to the previous sum stored in the register 21. In that manner, while the second input to the half-adder is zero, the add-subtract control follows the output of the counter 19. After 2M samples have been accumulated, the counter 13 produces a clear pulse through a gate 26 and an inverter 27 to inhibit the bank of gates 22, thus clearing the accumulator and storing in the register 21 the first of the next 2M samples.

The sign bit of the register 21 is transmitted to an adder/subtracter 28 in the accumulator 16 to cause a binary digit 1 to be added or subtracted to the sum stored in a register 29. Since only a binary 1 is to be added or subtracted according to the sign of the accumulated 2M samples in the register 21, the parallel adder/subtracter 28 and parallel register 29 could be replaced by an up-down counter incremented or decremented by the pulse output of the gate 26 according to the sign of the accumulated 2M samples. However, a parallel adder/subtracter avoids ripple carry delays in the counter with less logic gates than would be required to reduce ripple carry delays in an up-down counter.

In the implementation shown in FIG. 3, the counter 19 is assumed to have nine stages in order to divide the frequency of the system clock by 512. In that manner, the output from the most significant stage of the timing counter 19 is a square wave signal of the same frequency as the incoming signal. The system clock pulses are applied to the counter 19 through a gate 30 which is enabled when a delay counter 31 has counted down to zero.

To retard the output of the timing counter 19 (by some multiple of 1/512 of a cycle of the incoming signal), the delay counter 31 is preset to the sum of $\Delta_1$ SGN and $\Delta_2$ $\Sigma$ in response to the sign bit of the adder/-subtracter 18 when the counter 19 recycles to zero, thus causing the delay counter 31 to disable the gate 30 until the delay counter counts down to zero to enable a gate 32. This occurs only once every M cycles under control of the sample counter 13 via gates 33. Presetting of the delay counter is, of course, controlled by the sign of the sum of $\Delta_1$ SGN and $\Delta_2$ $\Sigma$. If that sign is positive, the delay counter 31 is not preset. Instead, the timing counter 19 is preset to that sum, thus advancing the timing output of the counter 19. If there is a phase error, this presetting will retard or advance the timing counter 19 every 2M samples, via the control gates 33, to bring the square wave output from the counter 19 into time coincidence with the incoming waveform to within 1/512 of a cycle of the incoming waveform.

In this exemplary embodiment, the constants $\Delta_1$ and $\Delta_2$ are constrained to be multiples of 1/512 of a cycle of incoming waveform, and are selected to be 6/512 and 1/512 of a cycle, respectively.

Consequently, the product $\Delta_1$ SGN is formed by adding a number $n_1$ equal to 6 in binary form to the product $\Delta_2$ $\Sigma$ . Since $\Delta_2$ is selected to be only one fraction (1/512) of the reference waveform cycle, the multiplier 17 is required to simply multiply the sum $\Sigma$ from the accumulator 16 by unity. Therefore, this multiplication is carried out by merely transmitting the output of the accumulator in binary form (*2's* complement) to the adder/subtracter 18. There the total $\Delta_1$ SGN + $\Delta_2$ $\Sigma$ is formed as the product $\Delta_1$ SGN is formed. If $\Delta_2$ were selected to be some number of fractions of the input waveform cycle equal to $2^n$, where *n* is a whole integer 1, 2, —, the function of the multiplier 17 could be implemented by simply scaling since $\Delta_2$ is a fixed quantity.

This digital second-order phase-locked loop operates as follows. The counter 13 produces an output every 2M cycles of the incoming waveform. That output is then applied to the accumulator 16 to adjust the timing of the sampling analog-to-digital converter 11 via the timing counter 19. In that manner, the output of the timing counter is updated by $\pm$ ($\Delta_1$ SGN + $\Delta_2$ $\Sigma$) $2\pi$ radians every 2M cycles of the incoming waveform. The samples containing carrier tracking information (two per local subcarrier reference developed at the output of the counter 19) are selected by the counter 19 via gates 24 and the algebraic sign of the addition is controlled by the output of the counter 19. While the communication system of which the tracking loop is a part is receiving a bit-sync modulated waveform, the modulation may be effectively removed by half-adding a local bit-sync reference (via the mode control gate 35 which is enabled only during the bit-sync mode of operation) with the output of the counter 19 to form the add-subtract control for the adder-subtracter 23 of the accumulator 12. That is accomplished by the half adder 25 while its second input is cyclically switching between 0 and 1 over M cycles of the subcarrier reference, namely the output of the counter 19. Bit-sync in the incoming waveform is thus effectively accounted for, assuming biphase modulation for bit-sync and data.

The number of samples selected for each updating cycle of the counter 19 is conveniently selected to be 2M to coincide with a bit-sync period of M cycles of the input waveform. A first-order tracking loop (not shown) determines the difference in phase between bit-sync periods and the output of the counter 34. Periodically, the counter 13 is updated (advanced or retarded) by the bit-sync tracking loop. This synchronizes the output of the counter 13, with the data bit periods which follow after the bit-sync modulation of the incoming waveform.

To account for data modulation of the incoming waveform, the hard limiter 14 is implemented as a half adder 36 coupling the sign bit of the register 21 to the add-subtract control terminal of the adder/subtracter 28. The second input to that half adder is from the data demodulating channel. In that manner, the data bits are demodulated from the sixteen samples taken of each incoming waveform sample for use in the system of which this phase-locked loop is a part, and for use in accounting for data modulation in the operation of the phase-locked loop. At the end of every 2M samples, the sign of the register 21 controls the addition or subtraction of a bit 1. For example, if the phase error is as shown in FIG. 2, the sign of the accumulated samples will be positive (represented by a bit 0), and a bit 1 is added to the content of the register 29, assuming the data is a bit 0. If the data is a bit 1, it means the incoming waveform has been phase shifted 180°. Therefore, the true carrier, or subcarrier, waveform is the inverted form of the waveform shown and the true sign of the accumulated samples is negative (represented by a bit 1). The half adder responds to the bit 1 data and causes the adder/subtracter to subtract a bit 1. Similarly if the sign is negative and the data bit is 0, a bit 1 is subtracted, but if the data bit is one, a bit 1 is added. A gate 37 forces the second input to the half adder 36 to be a bit 0 except during the presence of a data demodulation mode control signal.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A digital second-order phase-locked loop connected to receive an incoming waveform signal and adapted to generate a phase synchronized reference wave-form, said incoming waveform having two zero-crossover points where it crosses over from a negative to a positive and back to a negative voltage level with respect to a reference during each cycle, comprised of
a stable source of clock pulses,
a counter connected to receive said clock pulses at an input thereof to generate at an output terminal said reference waveform at the same frequency as said incoming waveform, means responsive to said counter for sampling said incoming waveform at times during the generation of said reference waveform at effective zero-crossover points thereof which correspond to said transition points of said incoming signal, and which would coincide with said transition points if said reference waveform were precisely in phase with said incoming waveform, means for converting the voltage levels of said samples from analog-to-digital form, means for periodically accumulating said voltage levels of said samples as converted into digital form to form a first sum, means for hard limiting said first sum to a predetermined quantity SGN in digital form, retaining the sign of the first sum, means for multiplying said signal SGN by a fixed multiplier equal to less than a number of clock pulses counted during one cycle of said reference waveform generated by said counter, where said multiplier is a whole integer, means for resetting said periodic accumulating means after a predetermined number of cycles of said reference waveform have been generated by said counting means, means responsive to said resetting means for continually accumulating said SGN signals by adding each SGN signal to previously accumulated sum of SGN signals each time said periodic accumulating means is reset, means for multiplying the accumulated sum of SGN signals by a fixed multiplier equal to less than said fixed number by which said signal SGN is multiplied, where said fixed multiplier is a whole integer, means responsive to said resetting means for adding the product of said signal SGN and its multiplier to the product of said accumulated sum and its multiplier to obtain a phase error value and sign in digital form, means for periodically advancing said counter by an amount equal to the value of said phase error when said phase error sign is positive, and for retarding said counter by an amount equal to the value of said phase error when said phase error sign is negative.

2. The combination of claim 1 wherein the period of said last named means is equal to the period of said accumulating means.

3. The combination of claim 2 wherein said period is set by said resetting means.

4. A phase-locked loop for synchronizing a reference waveform with an incoming waveform, where said reference waveform is of the same frequency as said incoming waveform, comprised of a stable source of clock pulses, a counter for counting said clock pulses to produce said reference waveform, means responsive to said counter for sampling said incoming waveform at the transition points of said reference waveform from one level to the other each half cycle, said sampling means including means for converting each sample into digital form with a sign, means for accumulating said samples over a period of M cycles of said reference waveform, said accumulating means including means for reversing the sign of every other sample accumulated, to produce a phase error indicator signal in digital form with a sign, means connected to said sample accumulating means for accumulating a digital signal representing a fixed whole integer according to the sign of said phase error indicator signal at the end of each period of M cycles, thereby integrating said phase error indicator signal, means connected to said phase error indicator integrating means for adding or subtracting to the accumulated sum of digital signals, at the end of each period of M cycles, a digital signal representing a fixed number greater than said fixed whole integer, said number being a whole integer, the operation of adding or subtracting being controlled by the sign of said phase error indicator signal, thus producing a composite first and second order phase error indicator signal in digital form, and means for updating said counter by an amount equal to said composite phase error indicator signal at the end of each period of M cycles by advancing or retarding said counter according to the sign of said composite phase error signal.

5. The combination of claim 4 wherein said fixed whole integer is equal to one.

6. The combination of claim 5 wherein said phase error indicator signal is equal to one.

7. The combination of claim 4, wherein said incoming waveform is modulated by synchronizing bits which alternate between one and zero every M cycles of said incoming waveform, thereby shifting by 180° the phase of alternate groups of M cycles of said incoming waveform, wherein said sampling means is responsive to said counter for taking additional periodic samples during each reference waveform cycle, and means for transmitting to bit-sync demodulating means all samples for use in a bit-sync tracking loop, and said accumulating means accumulates said samples by arithmetically adding or subtracting each sample under the combined control of said reference waveform and a bit-sync signal as separate input signals through a two-input logic network the output of which is at a given level only when one or the other, but not both, of the input signals is at a predetermined level, thus accounting for bit-sync modulation in the accumulation of samples.

8. The combination of claim 7 wherein said bit-sync signal is derived by a counter for counting M cycles of said reference waveform generating counter during which 2M samples of said incoming waveform are taken, and said counter is updated by said bit-sync tracking loop.

9. The combination of claim 8 including means for gating said bit-sync signal off, whereby accounting for bit-sync modulation of said incoming waveform can be terminated.

10. The combination of claim 9 wherein said incoming waveform is modulated by data bits which may be ones and zeroes, thereby shifting the phase by 180° of a group of M cycles of said incoming waveform for a bit one relative to a bit zero, including means for transmitting to data demodulating means all samples of said input waveform, and wherein said sign of said phase error indicator signal is transmitted to said means for integrating said phase error and to said means for producing said composite first and second order phase error indicator signal as separate input signals through a two-input logic network the output of which is at a given level only when one or the other, but not both, of the input signals is at a predetermined level, and the second input to said logic network is a data signal from said data demodulating means.

* * * * *